June 19, 1951  G. C. PAXTON  2,557,889
BOX FRAMING MACHINE
Filed Dec. 6, 1947  4 Sheets-Sheet 1

INVENTOR
G. C. Paxton
BY
ATTORNEYS

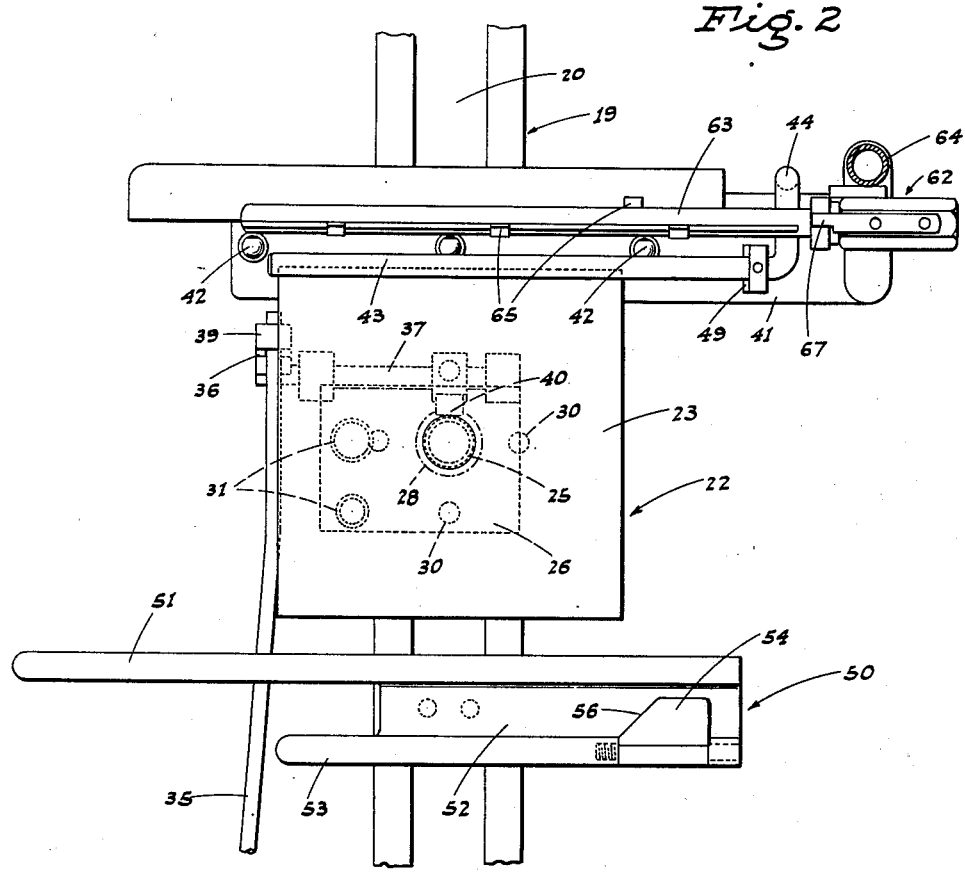

June 19, 1951  G. C. PAXTON  2,557,889
BOX FRAMING MACHINE
Filed Dec. 6, 1947  4 Sheets-Sheet 3

INVENTOR.
G. C. Paxton
ATTYS

June 19, 1951

G. C. PAXTON 2,557,889

BOX FRAMING MACHINE

Filed Dec. 6, 1947

Inventor

G. C. Paxton

By

ATTORNEY

Patented June 19, 1951

2,557,889

UNITED STATES PATENT OFFICE 2,557,889

BOX FRAMING MACHINE

Gerald C. Paxton, Sanger, Calif., assignor to General Nailing Machine Corporation, Sanger, Calif., a corporation of California Application December 6, 1947, Serial No. 790,067

21 Claims. (Cl. 1—15)

The present invention relates to improvements in box framing machines used to assemble and nail crate type boxes, such as lettuce crates or the like.

This crate type of box comprises prefabricated box ends each having a relatively heavy rectangular end frame with slats nailed to the inner side thereof whereby said box end has an outwardly opening recess therein defined or bordered by said end frame.

This invention has for an object the provision of a box framing machine which includes a framing assembly of novel structure and function designed to facilitates the manufacture of crate type boxes.

As an additional object thereof, the invention provides a machine having a box framing assembly, as above, which includes box end clamping and anvil units of new design, and which units are especially adapted to work with box ends of the type described.

It is a further object of the invention to provide each box end clamping and anvil unit with a rotary, box supporting anvil which effectively supports a box end, in successive rotative positions, for the nailing of the box slats thereto.

Another object of the invention is to provide a novel box end guide and supporting unit below each of the clamping and anvil units; said box end guide and supporting units each serving to maintain an adjacent box end against laterally outward deflection from proper position, and also supporting such box end against undesirable vertical tilting when said end is of elongated form and disposed lengthwise on and projecting some distance beyond the rotary anvil.

A further object of the invention is to produce a practical and reliable box framing machine and one which will be exceedingly effective for the purpose for which it is designed.

These objects are accomplished by means of such structure and relative arrangment of parts as will fully appear by a perusal of the following specification and claims.

In the drawings:

Figure 2 is an enlarged inner side elevation of one of the box end clamping and anvil units and showing the latter positioned for use with a box having substantially square ends.

Figure 3 is an enlarged plan view of the same.

Figure 1:
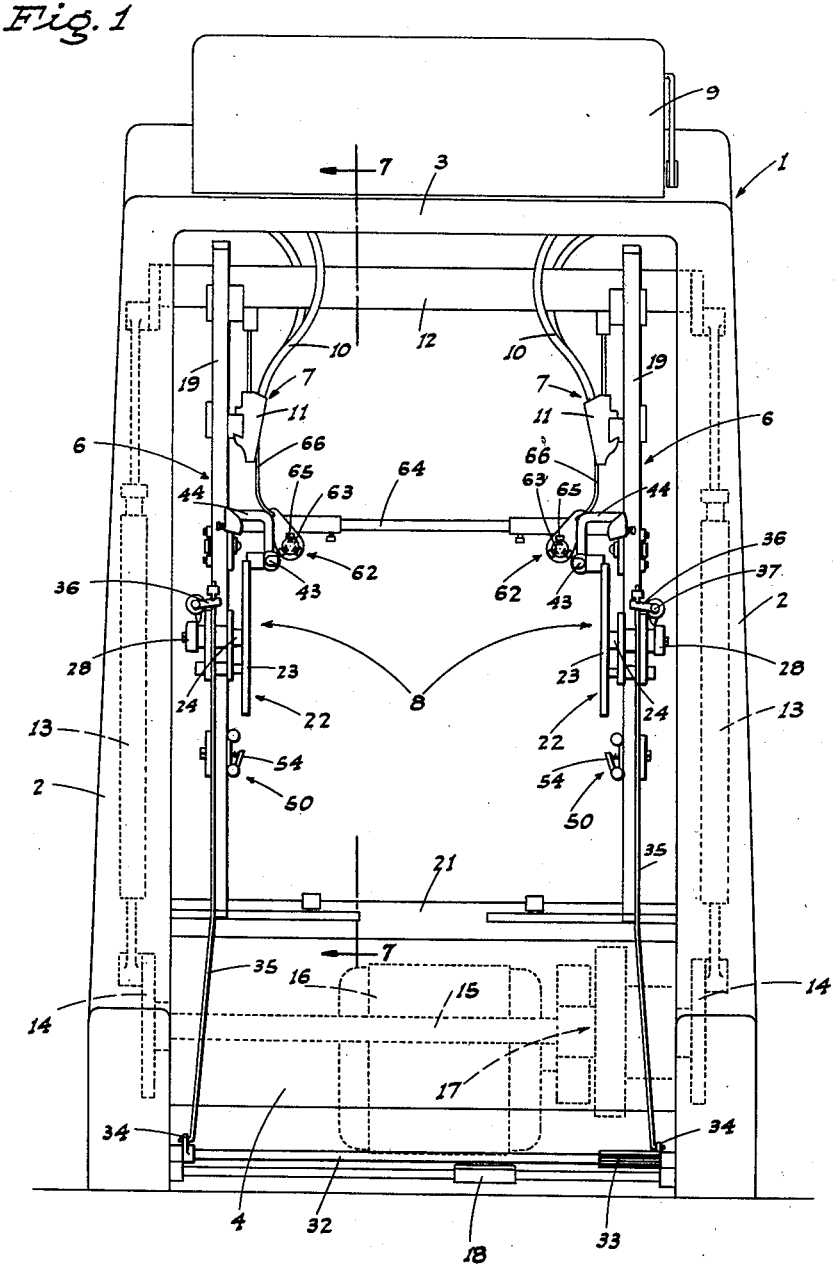
Figure 1 is a front elevation of the box framing machine embodying the present invention.

Referring now more particularly to the characters of reference on the drawings, the invention is embodied in a box framing machine which includes a main frame indicated generally at 1, having hollow legs 2 at opposite sides thereof; said legs being connected at the upper end by a top beam 3 and at the lower end by a hollow base 4. The main frame 1 thus defines a substantially rectangular opening 5 in which the box making parts of the machine are mounted.

Mainly within the opening 5 the machine includes an adjustable mounting frame, indicated generally at 6, which carries a pair of transversely spaced nailing units 7, and below said nailing units the mounting frame 6 supports a box framing assembly, indicated generally at 8, to which the present invention is mainly directed. This box framing assembly will hereinafter be described in greater detail as to its structure and function.

The top beam 3 of the main frame 1 supports a power actuated nail stripper 9 which feeds nails through flexible tubes 10 to the chucks 11 of the nailing units 7; the latter each including a row of said chucks extending horizontally through the machine.

The nailing units 7 are vertically reciprocated by a horizontal top driving bar 12 included, in vertically reciprocating relation, in the mounting frame 6, and said top driving bar 12 is actuated one complete cycle at a time, from a normally raised starting position by connecting rods 13 secured to opposite ends of said bar and depending within the hollow legs 2. These connecting rods 13 are attached at their lower ends to cranks 14 on a cross shaft 15 journaled in the hollow base 4. An electric motor 16 is mounted in the base 4, and by means of a clutch and brake unit 17 is adapted to rotate the cranks 14 through only a full cycle upon each depression of a control pedal 18. With each depression of the control pedal 18 the clutch and brake unit 17 functions to impart one revolution only to the cranks 14 which in turn work through the connecting rods 13 to reciprocate the top driving bar 12 through one cycle starting from its top position and actuating the nailing units 7.

The adjustable mounting frame 6 includes a transversely spaced pair of upstanding mounting posts 19 which are vertically slotted as at 20. At their lower ends the posts 19 are attached in guided and laterally adjustable, but normally fixed relation, to a bottom bar 21.

The top driving bar 12 projects in guided relation through the slots 20 of the upstanding mounting posts 19 adjacent their upper ends, whereby said top driving bar may vertically reciprocate to actuate the nailing units 17.

The above comprises the general assembly of the machine which is substantially the same as shown in U. S. Patent No. 2,488,757 to Harry D. Benson. The details of the box framing assembly 8 on such machine, and which is the subject matter of the present invention, are constructed and arranged as follows:

Below each of the nailing units 7 the corresponding vertically slotted mounting posts 19 are fitted with a box end clamping and anvil unit, indicated generally at 22. As both of the box end clamping and anvil units are identical, a detailed description of one will suffice for both.

Each box end clamping and anvil unit 22 comprises to the inside of the corresponding post 19, and in laterally inwardly facing relation, a rotary anvil 23 in the form of a relatively heavy duty rectangular plate. Centrally thereof the rotary anvil 23 is fixed with an axially outwardly projecting spindle 24 which extends in turnable relation through a bearing sleeve 25 secured in connection with and extending between an inner mounting plate 26 and an outer mounting plate 27 secured to the corresponding post 19 on opposite sides thereof. The spindle 24 and the bearing sleeve 25 project outwardly some distance beyond the outer mounting plate 27; said spindle at its free end being fitted with an enlarged end cap 28 whose purpose will hereinafter appear.

A releasable latching device in the form of a spring pressed detent 29, having considerable throw, is mounted between the plates 26 and 27 in radially offset but parallel relation to the spindle 24; such detent frictionally engaging in releasable relation in one of a plurality of recesses 30 in the adjacent face of the rotary anvil 23. These recesses 30 are disposed so that when the detent 29 engages in any one thereof, a corresponding upper edge of said anvil is horizontal. Further, the spindle 24 has considerable axial play in the bearing sleeve 25 so that the detent 29 normally yieldably maintains the anvil 23 in inwardly spaced relation from the inner mounting plate 26. In other words, the rotary anvil 23 is capable of moving laterally outward from its normal position toward the inner mounting plate 26 and against the action of the detent 29.

In order to permit of adjustment of the rotary anvil 23 lengthwise of the machine, i. e. in a direction horizontally through the same, the plates 26 and 27 are provided with an auxiliary, horizontally spaced set of bores 31 for the reception of the bearing sleeve 25 and the spring pressed detent 29.

The rotary anvil 23 is manually controlled to move between its normal position and a laterally outwardly retracted position by means of the following mechanism:

At the front thereof, the hollow base 4 is fitted with a cross shaft 32 having a forwardly projecting foot pedal 33. Radial levers 34 on opposite ends of the cross shaft 32 pivotally connect to the lower ends of pull rods 35, each of which leads upwardly to the corresponding box end clamping and anvil unit 22. At its upper end each pull rod 35 projects through a radial arm 36 on a horizontal and longitudinal shaft 37 carried outwardly of the corresponding post 19 in bearings 38 on the adjacent outer mounting plate 27. A head 39 on the pull rod 35 bears, in working relation, against the upper edge of the radial arm 36, whereby depression of the pedal 33, working through the above described connections, rotates the shaft 37; the latter being fitted with a rotary dog 40 which bears against the end cap 28. Consequently, upon rotation of the shaft 27, which is in a direction so that the dog 40 works outwardly when the pedal 33 is depressed, the cap 28 is likewise shifted outwardly carrying with it the spindle 24 and the rotary anvil 23. In this manner the operator of the machine, at any selected time, can cause both of the rotary anvils 23 to simultaneously shift laterally outwardly for the purpose hereinafter described.

The following box end clamping mechanism cooperates with each rotary anvil 23 adjacent the upper edge portion thereof, and comprises a mounting plate 41 secured horizontally and longitudinally to the corresponding post 19 on the inside some distance above the inner mounting plate 26. The mounting plate 41 is fitted on its inner face with a horizontal row of box end engaging rollers 42.

Inwardly of both the mounting plate 41 and rotary anvil 23 there is a horizontal longitudinally extending clamping arm 43 which is formed in integral relation, and at its rear end with a generally U-shaped inverted connection yoke 44 which straddles the mounting plate 41. The outermost leg of the yoke 44 is journalled in a bearing 45 on the outside of mounting plate 41 and below such bearing the yoke 44 merges in integral relation with forwardly extending actuating leg 46. The actuating leg 46 is disposed outwardly of the post 19 and is of a length to lap the slot 20 of said post; there being a roller 47 on said leg 46 projecting into the slot. Each nailing unit 7 includes a plunger cam 48 depending in the post slot 20 so that as such nailing unit 7 drives downwardly, the plunger cam 48, which projects some distance below the chucks 11, first engages the roller 47 and urges the actuating leg 46, outwardly. This results in corresponding motion of the clamping arm 43, i. e. motion of said clamping arm 43 toward the roller supporting mounting plate 41 which acts as a cooperating clamping member. The clamping arm 43 carries at its rear end portion an adjustable, box end stop 49 whose purpose is to properly position each box end lengthwise of the machine.

Below each rotary anvil 23 the corresponding post 19 is fitted with a box end guiding and supporting unit, indicated generally at 50, and each such unit comprises a horizontal, longitudinally extending box end guide rod 51, carried on a backing plate 52, secured to such post. Below the box end guide rod 51 the backing plate 52 carries a horizontal and longitudinal supporting rod 53 on the rear end portion of which there is pivotally mounted a swinging seat block 54 normally disposed at a laterally inward and upward incline, but yieldably urged to such position by a spring 55, and there is suitable stop means to limit motion of the seat block beyond said position by the spring. The forward or leading edge of the seat block 54 is cut at an upward and rearward incline, as at 56.

The above described box framing assembly functions in the following manner:

With the nailing units 7, including the plunger cams 48, in normally raised position, and with the rotary anvils 23 in normally advanced or inward position, the operator standing in front of the machine inserts a pair of prefabricated box ends 57 onto each of the rotary anvils 23. These box ends 57 are of the crate type which includes a rectangular frame 58 having slats 59 on the inner side whereby an outwardly opening recess 60 is provided, and the anvils 23 engage in said recesses when the box ends are placed in the machine.

The adjustable box end stops 49 on the clamping arms 43 limit the extent to which the box ends 57 may be projected into the machine.

After the box ends 57 are engaged on the rotary anvils 23, with the latter in the recesses 60, and said box ends 57 resting on the upper edges of the anvils, the box or crate is framed by successive operations; i. e. the nailing of side slats, then bottom slats, and finally the opposite side slats; each operation being accomplished upon a quarter turn of the anvils 23, the latter being preferably turned forwardly at the top.

The slats, indicated at 61, for either the sides or bottom, are placed—for each successive operation—in spanning relation between the box ends 57; the spacing of such slats being accomplished through the medium of automatic, shook stop units 62 of rotary type as fully explained in the above-mentioned Benson patent. These automatic, shook type units 62 include rotary spindles 63 which project forwardly from a transverse horizontal back bar 64; such rotary spindles 63 including adjustable and differentially spaced stops 65 thereon. The rotary spindles 63 are turned through a part-circle and to bring predetermined ones of the stops 65 uppermost, with each downward stroke of the horizontal top driving bar 12; the interconnecting mechanism including control rods 66 and ratchet mechanisms 67. The back bar 64 is adjustable as to length, and spans between the rear ends of the mounting plates 41.

With the slats 61 for each side, or bottom, of a box engaged with the then uppermost edges of the box ends 57, and with said slats engaging and spaced by the then uppermost stops 65, the operator depresses the control pedal 18, whereupon the horizontal top driving bar 12, together with the connected nailing units 7, function through a complete cycle, i. e. a downward stroke followed by an upward stroke.

With the downward stroke the plunger cam 48 first actuates the box end clamping mechanisms to cause the clamping arms 43 to move toward the mounting plates 41, whereby to firmly and frictionally engage the adjacent portions of the box ends 57 between said clamping arms 43 and the rollers 42. An instant later the chucks 11 of the nailing units 7 engage the slats 61 and nail them to the box ends, whereupon said nailing units 7, together with the plunger cams 48, rise to their starting position.

After the slats 61 have been nailed to one side of the box ends, the partially framed or assembled box, together with the rotary anvils 23, are rotated toward the operator a quarter turn; the detents then engaging in corresponding recesses 30 to maintain the anvils 23 stationary for the bottom slat nailing operation. This nailing operation is the same as above described, as is the next following operation for nailing of the opposite side slats.

The slats 61 are properly positioned lengthwise prior to each nailing operation by horizontal, longitudinally extending slat flushing plates 68 of inverted channel shape which rest on or engage over fulcrum bars 69 along the top edges of the mounting plates 41; the back flange of each flushing plate being spring-pressed inwardly by springs 70 on cap screws 71 which project through said flange into the corresponding mounting plate 41. The inner flange of each slat flushing plate 68 is rounded, as shown, for slat engagement to substantially flush the slat ends with adjacent box ends 57.

After a box or crate has been framed in the machine by three successive slat nailing operations, the open top thereof is facing rearwardly, i. e. away from the operator, and he then depresses the pedal 33, causing laterally outward retraction of the rotary anvils 23 until they escape the frame ends 58. When this occurs, the framed box or crate is released from the framing assembly 8 and is discharged by hand out of the back of the machine onto a suitable carry-off conveyor (not shown).

Figure 4:
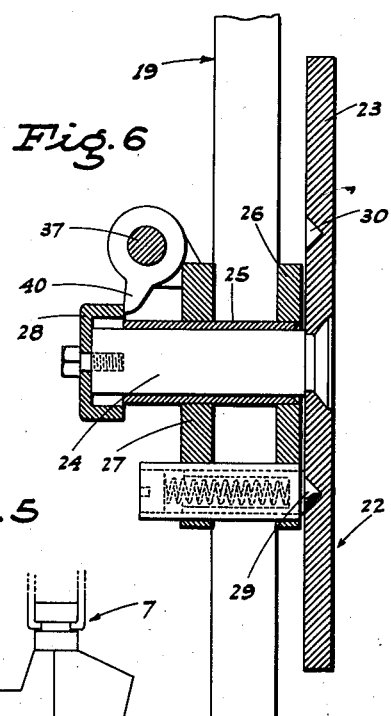
Figure 4 is an enlarged end elevation of one of said box end clamping and anvil units, with a box end disposed therein and with the corresponding nailing unit and plunger cam raised.
Figure 6:
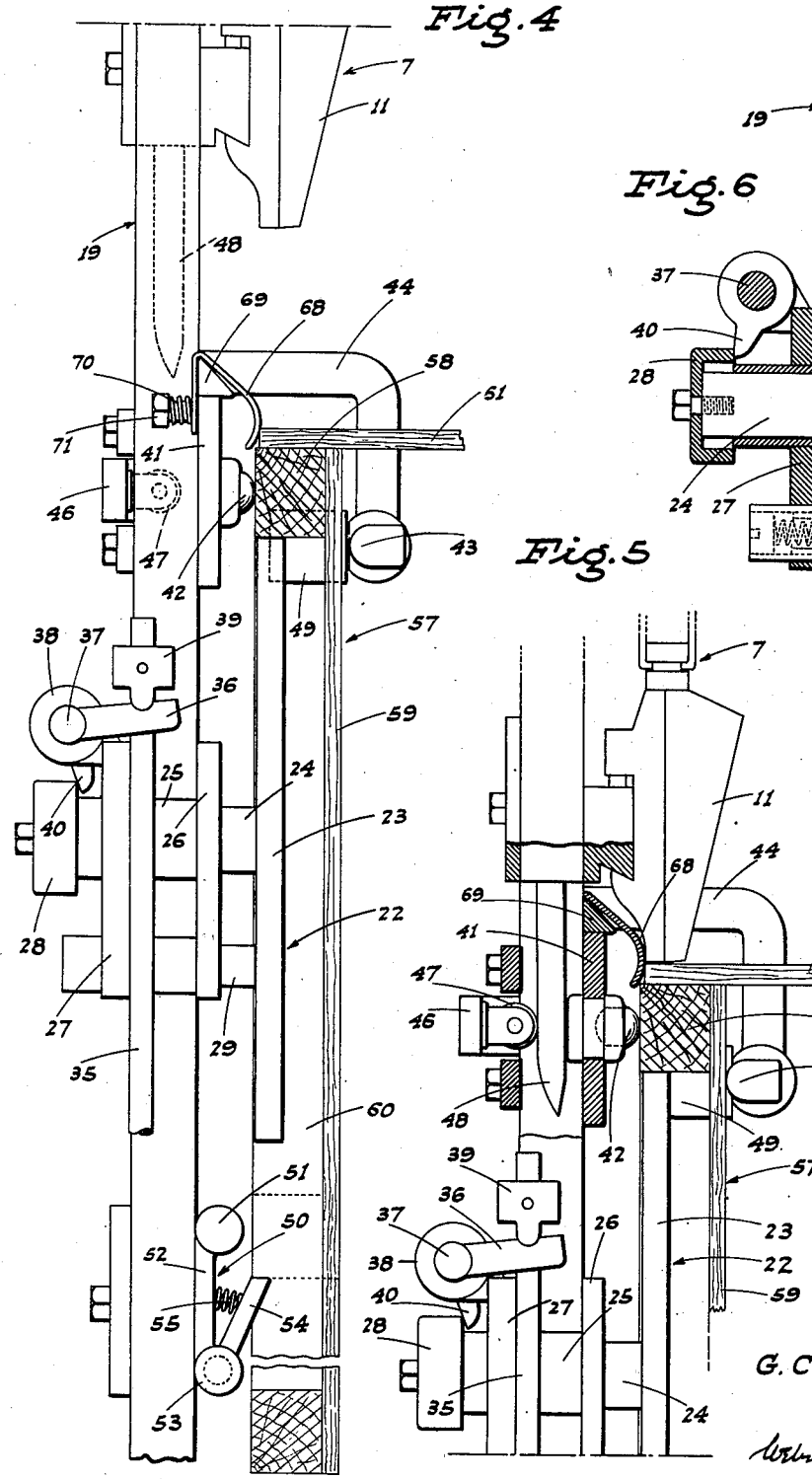
Figure 6 is an enlarged fragmentary sectional elevation of one of the rotary anvils, together with its mount and actuating mechanism.
Figure 5:
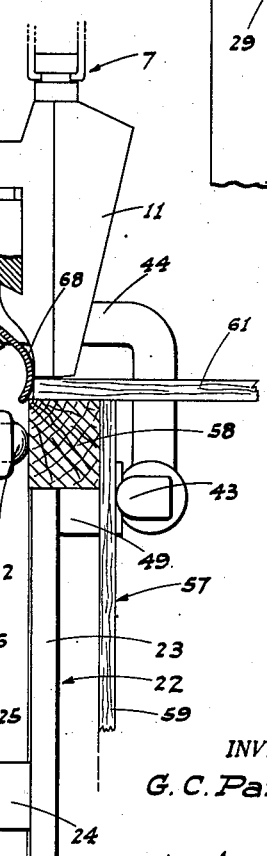
Figure 5 is an enlarged fragmentary sectional elevation of said box end clamping and anvil unit but shows the nailing unit and plunger cam in lowered position.
Figure 7:
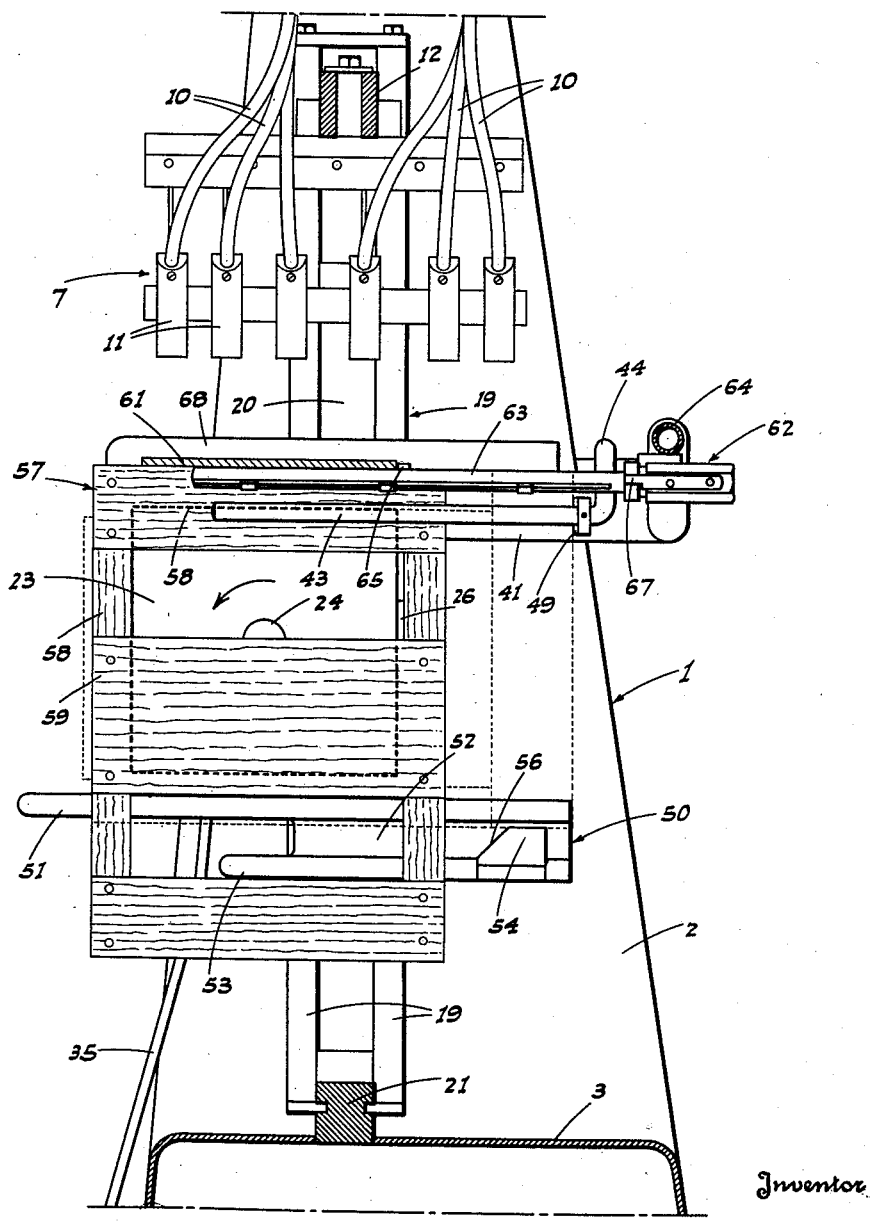
Figure 7 is a sectional elevation of the machine, on line 7—7 of Fig. 1, showing the anvil units positioned for elongated box ends and with one of the latter in place on the anvil.

If the box ends are substantially rectangular, the anvils may be set in the rearmost position or substantially centrally of the uprights 19, as shown in Fig. 4. In such cases, the seat blocks 54 do not function. This machine, however, is particularly adapted to the framing of boxes of the type known as "lettuce crates" in which the rectangular frames of the box ends are longer than they are wide. The anvil units are then set forwardly, as shown in Fig. 7, the anvil plates 23 being of a size to fit inside the narrow dimension of a box end 57. In starting to nail the slats 61 about the box ends, the latter are placed on the anvil plates with one narrow side uppermost and horizontally, and since the top working edges of the anvil plates engage under the box end frame for substantially its full length, said plates then take the full thrust of the nailing units. At this time, the long sides of the box end frame hang below the guide rods 51 and seat blocks 54, as shown in Fig. 7. Rods 51, which then lie closely adjacent the outer edges of the box ends, prevent the latter from materially tilting laterally of the anvil plates.

After the first slat 61 has been nailed on, the anvil plates are turned forwardly a quarter turn to bring one long side of the box end horizontally and uppermost for the nailing of the corresponding slats 61 thereon.

This turning of the anvils and re-positioning of the box ends in the machine is preferably accomplished by the operator pulling forwardly and downwardly on the already nailed-on slat 61, so that as the anvil plates turn, the box ends shift forwardly on said plates and their rear corners clear the stops 49. In thus swinging up, the depending long sides of the box ends deflect the seat blocks 54 by riding against the inclined edge 56 thereof, said blocks snapping back into position after the box end frames have cleared the same. Once the anvil plates have been turned 90 degrees from the starting position, the box end frames are shoved rearwardly until they engage the stop 49, the portion of the bottom side of the box ends which overhangs rearwardly beyond the anvil plates resting on the seat blocks 54, as indicated in dotted lines in Fig. 7.

Any nailing thrust imparted to those portions of the box ends which are not supported by the anvils will be taken by the seat blocks 54.

Slats 61 having been nailed on the top of said long side of the box ends, the latter are again pulled forwardly on the anvil plates and the latter turned forwardly through 90 degrees to position the other short side of the box end frames thereon for a slat nailing operation.

With the described box framing assembly 8, a box or crate may be framed readily and quickly in successive rotative steps without the necessity of removing the box from the machine. Yet when the box is framed its release is accomplished quickly merely by the retraction of the rotary anvils 23.

The present invention provides a practical and efficient machine for the framing of crate type boxes, as for example the type of box known as a lettuce crate.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A box end supporting, rotary anvil unit for a box framing machine which includes an upstanding mounting post, comprising a rotary, box end supporting anvil having a plurality of working edges about its periphery, a structure mounting the rotary anvil in connection with the post for rotation about an axis with the anvil facing laterally of said post and for axial shifting between an advanced position away from the post and a retracted position toward the same, manually controlled mechanism operative to effect such axial shifting of the rotary anvil, and a releasable latching device supported from the post and engaging the anvil to normally maintain it in selective predetermined rotative positions with corresponding working edges uppermost; said latching device being a spring-pressed detent whose axial throw is sufficient to urge the rotary anvil to its advanced position, the anvil moving to retracted position against the action of said detent.

2. A box end supporting, rotary anvil unit for a box forming machine which includes an upstanding mounting post, comprising a rotary anvil in the form of a plate having a plurality of working edges about its periphery, an axial spindle on the plate, a horizontal axis bearing on the post in which the spindle turnably engages with the anvil plate facing laterally from the post, the spindle being capable of axial shifting motion of the anvil plate between an advanced position away from the post and a retracted position toward the same, and manually controlled mechanism operative to effect such axial shifting of the anvil plate.

3. A box end supporting, rotary anvil unit for a box forming machine which includes an upstanding mounting post, comprising a rotary anvil in the form of a plate having a plurality of working edges about its periphery, an axial spindle on the plate, a horizontal axis bearing on the post in which the spindle turnably engages with the anvil plate facing laterally from the post, the spindle being capable of axial shifting motion of the anvil plate between an advanced position away from the post and a retracted position toward the same, a spring actuated device cooperating with the anvil plate to yieldably urge it to said advanced position and to also releasably maintain selective and predetermined rotative positions thereof with corresponding working edges uppermost, and manually controlled mechanism operative to effect axial shifting of the anvil plate toward its retracted position.

4. A box end supporting, rotary anvil unit for a box forming machine which includes an upstanding mounting post, comprising a rotary anvil in the form of a plate having a plurality of working edges about its periphery, an axial spindle on the plate, a horizontal axis bearing on the post in which the spindle turnably engages with the anvil plate facing laterally from the post, the spindle being capable of axial shifting motion of the anvil plate between an advanced position away from the post and a retracted position toward the same, a spring actuated device cooperating with the anvil plate to yieldably urge it to said advanced position and to also releasably maintain selective and predetermined rotative positions thereof with corresponding working edges uppermost, and manually controlled mechanism operative to effect axial shifting of the anvil plate toward its retracted position; said manually controlled mechanism including an enlarged cap on the free end of the spindle beyond the bearing, a cross shaft adjacent said cap, a rotary dog on the cross shaft engaging the cap in a manner to shift the spindle in an anvil plate retracting direction upon rotation in a given direction of said cross shaft, a radial arm on the cross shaft, a pull rod connected to the radial arm, and a foot pedal arranged to pull the rod when said pedal is depressed.

5. A box end supporting, rotary anvil unit for a box forming machine which includes an upstanding mounting post, comprising a rotary anvil in the form of a plate having a plurality of working edges about its periphery, an axial spindle on the plate, a horizontal axis bearing on the post in which the spindle turnably engages with the anvil plate facing laterally from the post, the spindle being capable of axial shifting motion of the anvil plate between an advanced position away from the post and a retracted position toward the same, a spring actuated device cooperating with the anvil plate to yieldably urge it to said advanced position and to also releasably maintain selective and predetermined rotative positions thereof with corresponding working edges uppermost, and manually controlled mechanism operative to effect axial shifting of the anvil plate toward its retracted position; said spring actuated device comprising a spring-pressed detent having substantial axial throw, said detent being mounted in connection with the post parallel to but radially offset from the spindle and bearing, and the anvil plate having recesses in its adjacent face to frictionally and releasably receive the detent.

6. A box end supporting, rotary anvil assembly for a box framing machine which includes a pair of transversely spaced, upstanding mounting posts, said assembly comprising a pair of rotary anvil units mounted on corresponding posts and each such unit including a rotary anvil disposed laterally inwardly of the corresponding post, the rotary anvils facing each other in spaced relation and including a plurality of like working edges in like circumferential order, structures mounting the rotary anvils on corresponding posts for rotation about alined axes and for axial shifting motion between advanced positions away from corresponding posts and retracted positions toward the same, said rotary anvils being normally advanced, and manually controlled mechanism operative to simultaneously retract said rotary anvils.

7. A box end supporting, rotary anvil assembly for a box framing machine which includes a pair of transversely spaced, upstanding mounting posts, said assembly comprising a pair of rotary anvil units mounted on corresponding posts and each such unit including a rotary anvil disposed laterally inwardly of the corresponding post, the rotary anvils facing each other in spaced relation and including a plurality of like working edges in like circumferential order, structures mounting the rotary anvils on corresponding posts for rotation about alined axes and for axial shifting motion between advanced positions away from corresponding posts and retracted positions toward the same, said rotary anvils being normally advanced, and manually controlled mechanism operative to simultaneously retract said rotary anvils; there being spring-actuated devices mounted in connection with corresponding posts and cooperatively engaging the adjacent rotary anvils to yieldably urge the same to advanced positions and to also releasably maintain selective and predetermined rotative positions thereof with corresponding working edges alined and uppermost.

8. A box end supporting, rotary anvil assembly for a box framing machine which includes a pair of transversely spaced, upstanding mounting posts, said assembly comprising a pair of rotary anvil units mounted on corresponding posts and each such unit including a rotary anvil disposed laterally inwardly of the corresponding post, the rotary anvils facing each other in spaced relation and including a plurality of like working edges in like circumferential order, structures mounting the rotary anvils on corresponding posts for rotation about alined axes and for axial shifting motion between advanced positions away from corresponding posts and retracted positions toward the same, said rotary anvils being normally advanced, and manually controlled mechanism operative to simultaneously retract said rotary anvils; said manually controlled mechanism including motion converting connections cooperating with each spindle, pull rods depending from said connections, a cross shaft adjacent floor level, radial arms on said cross shaft to which corresponding rods are pivotally connected, and a foot pedal radiating from the cross shaft.

9. A box end clamping and supporting anvil unit for a box framing machine having an upstanding mounting post and a normally raised but downwardly movable, power actuated nailing unit guided by the post, said box end clamping and supporting anvil unit comprising a laterally facing rotary anvil adjacent the post below the nailing unit, means mounting the rotary anvil in connection with the post for turning about a horizontal axis, the rotary anvil having a plurality of like working edges about their peripheries, a pair of longitudinal, laterally spaced, boxed end clamping members, one being secured to the post and the other being mounted beyond the rotary anvil for swinging motion towards said one clamping member, and mechanism responsive to downward motion of the nailing unit operative to cause said other clamping member to swing laterally toward said one member in clamping relation to a box end supported therebetween by the rotary anvil.

10. A box end clamping and supporting anvil unit for a box framing machine having an upstanding mounting post and a normally raised but downwardly movable, power actuated nailing unit guided by the post, said box end clamping and supporting anvil unit comprising a laterally facing rotary anvil adjacent the post below the nailing unit, means mounting the rotary anvil in connection with the post for turing about a horizontal axis, the rotary anvil having a plurality of working edges about their peripheries, a pair of longitudinal, laterally spaced, box end clamping members, one being secured to the post and the other being mounted beyond the rotary anvil for swinging motion toward said one clamping member, and mechanism responsive to downward motion of the nailing unit operative to cause said other clamping member to swing laterally toward said one member in clamping relation to a box end supported therebetween by the rotary anvil; said mechanism including a longitudinal leg corresponding to said other clamping member but disposed on the opposite side of the post, said other clamping member and actuating leg being parts of a unitary, pivotally mounted structure which is generally U-shaped in plan, and a plunger cam on the nailing unit adapted to engage and urge the actuating leg laterally outward.

11. A box end clamping and supporting anvil unit for a box framing machine having an upstanding mounting post and a normally raised but downwardly movable, power actuated nailing unit guided by the post, said box end clamping and supporting anvil unit comprising a laterally facing rotary anvil adjacent the post below the nailing unit, means mounting the rotary anvil in connection with the post for turning about a horizontal axis and for axial shifting motion between an advanced position away from the post, and a retracted position toward the post, the rotary anvil having a plurality of working edges about their peripheries, a pair of longitudinal, laterally spaced, box end clamping members, one being secured to the post and the other being mounted beyond the rotary anvil for swinging motion toward said one clamping member, mechanism responsive to downward motion of the nailing unit operative to cause said other clamping member to swing laterally toward said one member in clamping relation to a box end supported therebetween by the rotary anvil, and manually controlled mechanism operative to effect such axial shifting of the rotary anvil.

12. A box end clamping and supporting anvil unit for a box framing machine having an upstanding mounting post and a normally raised but downwardly movable, power actuated nailing unit guided by the post, said box end clamping and supporting anvil unit comprising a laterally facing rotary anvil adjacent the post below the nailing unit, means mounting the rotary anvil in connection with the post for turning about a horizontal axis and for axial shifting motion between an advanced position away from the post, and a retracted position toward the post, the rotary anvil having a plurality of working edges about their peripheries, a pair of longitudinal, laterally spaced, box end clamping members, one being secured to the post and the other being mounted beyond the rotary anvil for swinging motion toward said one clamping member, mechanism responsive to downward motion of the nailing unit operative to cause said other clamping member to swing laterally toward said one member in clamping relation to a box end supported therebetween by the rotary anvil, and manually controlled mechanism operative to effect such axial shifting of the rotary anvil; there being a spring actuated device cooperating with the rotary anvil to yieldably urge it to said advanced position and to also releasably maintain selective and predetermined rotative positions thereof with corresponding working edges uppermost.

13. A box end clamping and supporting anvil unit for a box framing machine having an upstanding mounting post and a normally raised but downwardly movable, power actuated nailing unit guided by the post, said box end clamping and supporting anvil unit comprising a laterally facing rotary anvil adjacent the post below the nailing unit, means mounting the rotary anvil in connection with the post for turning about a horizontal axis, the rotary anvil having a plurality of working edges about its periphery, means actuated in response to downward motion of the nailing unit to clampingly engage a box end supported by the anvil, and a longitudinal box end guide rod on the post below the rotary anvil.

14. A box end clamping and supporting anvil unit for a box framing machine having an upstanding mounting post and a normally raised but downwardly movable, power actuated nailing unit guided by the post, said box end clamping and supporting anvil unit comprising a laterally facing rotary anvil adjacent the post below the nailing unit, means mounting the rotary anvil in connection with the post for turning about a horizontal axis, the rotary anvil having a plurality of working edges about its periphery, means actuated in response to downward motion of the nailing unit to clampingly engage a box end supported by the anvil, and a box end seat block mounted in connection with the post below and to the rear of the rotary anvil in position to support, from below, a horizontally elongated and extending box end supported in longitudinally spaced relation by the rotary anvil; said box end seat block being laterally yieldable in response to engagement by an anvil-supported box end when rotated with said anvil.

15. In a box framing machine which includes an upstanding support, a laterally facing box end anvil adjacent the support, a structure mounting the anvil in connection with the support, a vertically reciprocable, power actuated nailing unit associated with the support in nailing relation to a box end partially engaged on the anvil, and a box end seat block mounted in connection with the support beyond the anvil in a direction and in a position to be engaged from above by a portion of the box end not directly supported by the anvil.

16. In a box framing machine which includes an upstanding support, a laterally facing box end anvil adjacent the support, a structure mounting the anvil in connection with the support, a vertically reciprocable, power actuated nailing unit associated with the support in nailing relation to a box end partially engaged on the anvil, and a box end seat block mounted in connection with the support beyond the anvil in a direction and in a position to be engaged from above by a portion of the box end and not directly supported by the anvil; the anvil being mounted for rotation, and said seat block being inclined into the path of rotation of a box end on the anvil, and being laterally yieldable but downwardly unyielding.

17. A box end supporting rotary anvil unit for framing boxes in which the box ends include rectangular end frames, such unit including spaced apart supporting elements, a pair of spaced apart rotatable anvil plates each supported on one of the supporting elements for relative out and in lateral movement, such plates being of such a size that they may be received within the rectangular end frames of the box ends with the inner peripheries of the end frames relatively close to the peripheral edges of the anvil plates whereby the inner peripheries of the sides of the box end frames will rest on adjacent working edges of the anvil plates with the rotation of such anvil plates, yieldable means operable by the box ends to be moved clear of the frames as the latter are moved onto the plates and such yieldable means being operable to thereafter clamp the box ends in position with the anvil plates within the confines of the box end frames, and nailing units effective to nail slats to the box ends while the anvil plates are so disposed within the box end frames.

18. A rotary anvil unit for a machine for framing boxes which include rectangular end frames, and which machine includes an upstanding mounting post, such unit comprising a supporting anvil having a plurality of working edges about its periphery, each edge being adapted to project under and support one frame element of the rectangular end frame of a box in nailing position, and means mounting the anvil on the post for rotative movement relative thereto.

19. A rotary anvil unit as in claim 18 including a releasable latching device mounted on the post and engaging the anvil and effective to normally maintain the anvil in predetermined selective rotative positions.

20. A rotary anvil unit as in claim 19 in which such latching means comprises a spring pressed detent, the anvil being provided with spaced circumferentially recesses engageable by the detent.

21. A rotary anvil unit as in claim 20 in which the anvil is shiftable from a position laterally away from the post to a position nearer the post, the spring pressed detent normally holding the anvil in said first position, and means mounted on the post and connected with the anvil and operable to selectively shift the anvil to said second position.

GERALD C. PAXTON.

REFERENCES CITED

The following references are of record in the file of this patent:

UNITED STATES PATENTS

| Number | Name | Date |
|---|---|---|
| 1,652,373 | Parker | Dec. 13, 1927 |
| 1,978,613 | Twomley | Oct. 30, 1934 |
| 2,041,339 | Hart | May 19, 1936 |